F. CARTLIDGE.
CLUTCH MECHANISM.
APPLICATION FILED MAR. 5, 1918.
1,434,772.
Patented Nov. 7, 1922.
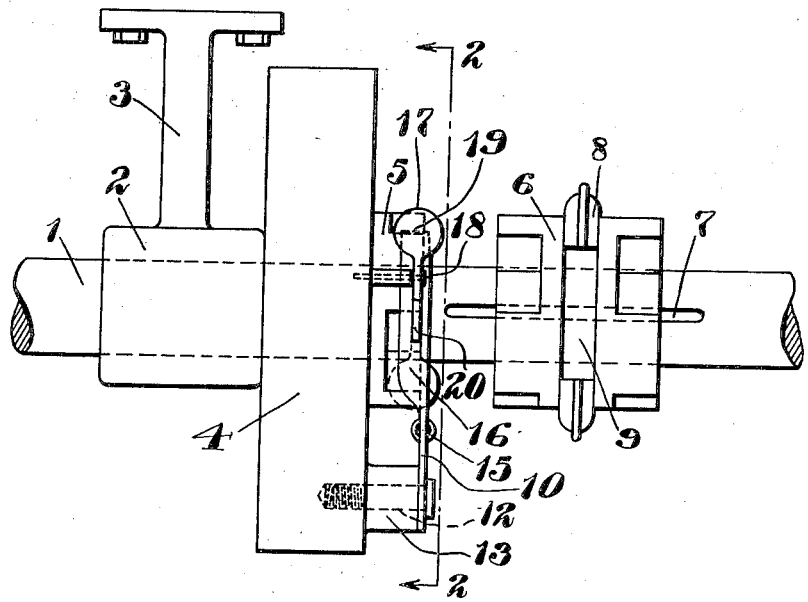
Fig. 1.
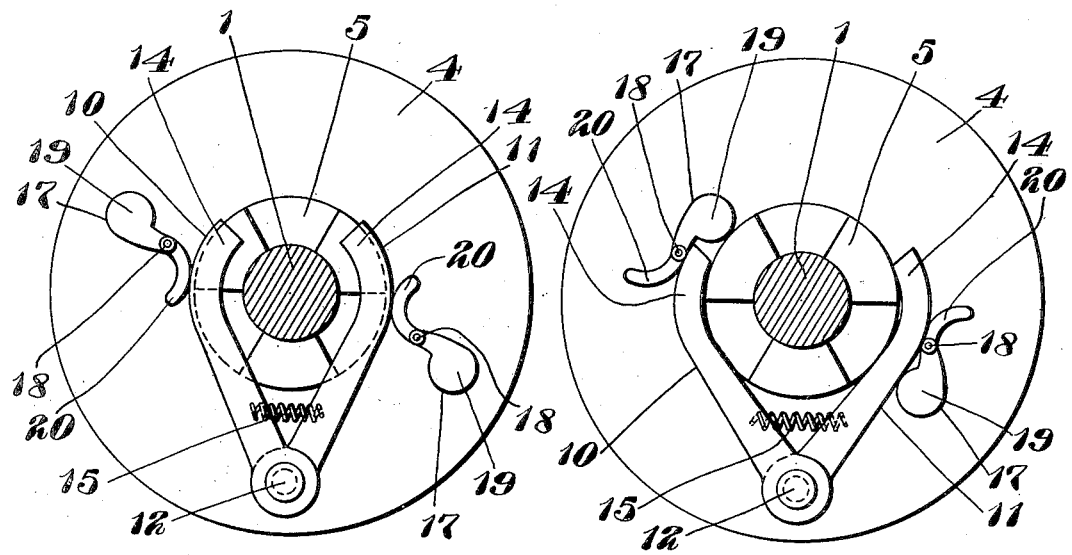
Fig. 2.
Fig. 3.
Inventor:
Frank Cartlidge,
by
atty.

Patented Nov. 7, 1922.

1,434,772

UNITED STATES PATENT OFFICE.

FRANK CARTLIDGE, OF CLAREMONT, NEW HAMPSHIRE, ASSIGNOR TO SULLIVAN MACHINERY COMPANY, A CORPORATION OF MASSACHUSETTS.

CLUTCH MECHANISM.

Application filed March 5, 1918. Serial No. 220,602.

*To all whom it may concern:*

Be it known that I, FRANK CARTLIDGE, a citizen of the United States, residing at Claremont, in the county of Sullivan and State of New Hampshire, have invented certain new and useful Improvements in Clutch Mechanism, of which the following is a full, clear, and exact specification.

My invention relates to clutch mechanism. It has for its object to provide improved clutch mechanism equipped with improved means controlling the connection of the clutch elements. A further object of my invention is to provide improved means responsive to the speed developed by one of the rotating members of the clutch and automatically controlled by the speed of rotation of the same, whereby the clutch elements are prevented from being connected until the speed drops below a predetermined value. These and other objects and advantages of my improved construction will, however, hereinafter more fully appear.

In the accompanying drawings I have shown for purposes of illustration one embodiment which my invention may assume in practice.

In these drawings,—

Fig. 1 is a side elevation of a clutch mechanism equipped in accordance with my improvement.

Fig. 2 is a sectional view, taken on line 2—2 of Fig. 1, showing the clutch shrouding members in their shrouding position.

Fig. 3 is a similar view showing the clutch shrouding members in their inoperative position.

In this illustrative construction, I have shown a shaft 1, which herein may be considered to be the driven shaft, mounted in a suitable journal 2 which is carried upon any suitable support 3. As shown, this shaft carries a freely rotatable member 4, such as a pulley or gear, and is also provided at a point adjacent the member 4 with a clutch element or member 5, herein of the tooth type, which is fixed to the member 4 and adapted to cooperate with a cooperating clutch element or member 6, herein also of the tooth type and carried on the shaft 1, the clutch member 6 being splined on that shaft, as shown at 7, and reciprocable longitudinally of the shaft by means of a clutch shipper 8 disposed in a groove 9.

In my improvement, means are provided whereby the clutch members 5 and 6 may not be connected except when the speed of rotation of the former is below a predetermined limit. These means may, obviously, assume various forms, but as shown it will be noted that they include shrouding means, herein comprising a plurality of shrouding members 10 and 11, adapted to be disposed over the working face of the clutch member 5 in such a manner as to prevent the meshing of teeth on the clutch members 5 and 6. More specifically, it will be noted that these members 10 and 11 are rotatable with the clutch member 5 and pivoted on a common pivot 12 carried on a suitable stud 13 disposed adjacent the periphery of the member 4. As shown, each of these members 10 and 11 also includes a preferably, though not necessarily, curved end having a shrouding portion 14 adapted to shroud the teeth of the clutch member 5. It will also be observed that a resilient connection, herein shown in the form of a coiled spring 15, is provided between these two members 10 and 11 and preferably at a point inside the pivot 12, which spring is normally effective to hold the members 10 and 11 in their inoperative position, shown in Fig. 3, with their shrouding surfaces 14 disposed outside the lines of the clutch member 5. In the form of my invention illustrated, it will be noted that each of these members 10 and 11 is also provided with a surface 16, preferably disposed substantially at right angles to the surface 14 and adapted to engage the periphery of the clutch member 5 and also to be engaged by suitable speed responsive means adapted to force the members 10 and 11 against the action of the spring 15 from their inoperative position shown in Fig. 3 to their operative position shown in Fig. 2 when the speed of the pulley 4 is above a predetermined limit. These means, as shown, include a plurality of weighted members 17, pivoted at 18 on a part rotatable relative to the axis of the shaft 1, herein shown as the member 4, and provided with weights 19 at one end and with preferably curved shroud engaging portions 20.

In the operation of my improved construction, it will be evident that when the member 5 begins to rotate at high speed, as by rotation of the member 4 or through any other suitable means, the centrifugal action will cause the weighted portions 19 of the members 17 to move outward and thereby swing the shroud engaging portions 20 thereof into engagement with the surfaces 16 on the shrouding members 10 and 11 in such a manner as to compress the spring 15 and cause the members 10 and 11 to move inward from the position shown in Fig. 3 to the position shown in Fig. 2. Obviously, in this position the shrouding surfaces 14 on the members 10 and 11 will shroud the teeth of the clutch member 5 in such a manner that should the clutch member 6 be reciprocated relative to the shaft 1, it would not be able to mesh with the clutch member 5 so long as the latter was driven at high speed. However, it will be noted that when the speed of the member 5 is lowered below a predetermined limit, the clutch elements 5 and 6 may be connected whenever desired. More specifically it will be observed that as the speed drops the force exerted by the weighted portions 19 of the members 17 will fall off and accordingly the spring 15 will be able to exert a sufficient pressure upon the members 10 and 11 to force them outwardly to the position shown in Fig. 3, against the diminished pressure exerted upon the members 10 and 11 by the portions 20 of the members 17. Obviously, in this position of the parts the clutch member 6 may be brought into mesh with the clutch member 5 whenever desired.

As a result of my improvement, it will be observed that means are provided whereby it is impossible for the two elements of the clutch to be connected while one of the clutch elements is rotating at an excessive speed, and that the means controlling this connection are entirely automatic in their operation and controlled by the speed. It will also be observed that these means are of an exceedingly simple construction and adapted readily and cheaply to be applied to any standard clutch mechanism and to withstand long use in service. These and other advantages of my improved construction will, however, be clearly apparent to those skilled in the art.

While I have in this application specifically described one embodiment which my invention may assume, and have illustrated the same as applied to one specific form of clutch, it will be evident that the invention may be modified and embodied in various other forms without departing from its spirit, and it is to be understood that it is my intention to include all such modifications within the scope of the appended claims.

What I claim as new and desire to secure by Letters Patent is:

1. In a clutch mechanism, cooperating clutch elements, manual means operable to effect connection thereof, and automatic means carried by one of said elements and movable to operative position by centrifugal force for positively preventing connection of said elements when one of said elements is rotated at a predetermined speed irrespective of the speed of rotation of the other.

2. In a clutch mechanism, cooperating clutch elements, manually operable means for effecting connection of said elements, and means carried by one of said elements for inhibiting connection thereof when one of said elements is rotated above a predetermined absolute speed, said means being inoperative below said predetermined speed and independent in its operation of the speed of said other element.

3. In a clutch mechanism, cooperating clutch elements, means operable to effect engagement thereof, and automatic means rotatable with one of said elements for positively preventing connection therewith when the same is rotating above a predetermined speed in either direction.

4. In a clutch mechanism, cooperating clutch elements, means operable to cause connection thereof, and weight controlled means on one of said elements for positively inhibiting connection between said elements when one of said elements is rotated above a predetermined speed, said means being inoperative at lesser speeds.

5. In a clutch mechanism, cooperating clutch elements, shrouding means on one of said elements for shrouding the working face of said element, and speed responsive means controlling said shrouding means and rendering the latter operative above a predetermined speed.

6. In a clutch mechanism, cooperating clutch elements, normally inoperative shrouding means for shrouding the working face of one of the same, and speed responsive means controlling said shrouding means.

7. In a clutch mechanism, cooperating clutch elements, shrouding means for shrouding the working face of one of the same, and cooperating oppositely acting speed controlled means controlling said shrouding means and acting to render the latter operative.

8. In a clutch mechanism, cooperating clutch elements, shrouding means for shrouding the working face of one of the same, and cooperating resilient and speed responsive means controlling said shrouding means.

9. In a clutch mechanism, cooperating clutch elements, shrouding elements for one of the same rotatable therewith, and speed responsive means distinct from said shrouding elements but likewise rotatable with said element for controlling the movement of said shrouding means.

10. In a clutch mechanism, cooperating clutch elements, normally inoperative shrouding elements for one of the same rotatable therewith, and speed responsive means likewise rotatable with said element for controlling the movement of said shrouding means.

11. In a clutch mechanism, cooperating clutch elements, shrouding members disposable over one of the same and pivoted thereon, resilient means normally rendering said shrouding members inoperative, and speed responsive means rotatable with said shroud carrying element and engageable with said shrouding members.

12. In a clutch mechanism, cooperating clutch elements, shrouding members disposable over one of the same and pivoted thereon on a common pivot, a spring connected between said shrouding members, and speed responsive means rotatable with said shroud carrying element and engageable with said shrouding members.

13. In a clutch mechanism, a plurality of cooperating toothed clutch members, a shrouding member rotatable with one of the same and having a shrouding surface disposable over the working face thereof, and speed responsive means for moving said shrouding member into shrouding position upon a predetermined increase in speed.

14. In a clutch mechanism, a plurality of cooperating toothed clutch members, a shrouding member rotatable with one of the same and having a shrouding surface disposable over the working face thereof, speed responsive means for moving said shrouding member into shrouding position upon a predetermined increase in speed, and means for rendering said shrouding member inoperative upon a predetermined drop in speed.

15. In a clutch mechanism, a plurality of cooperating clutch members, a shrouding member rotatable with one of the same and having a shrouding surface disposable over the working face thereof, and speed responsive means for moving said shrouding member into shrouding position upon a predetermined increase in speed.

16. In a clutch mechanism, a clutch element, a cooperating manually controlled clutch element movable into and out of operative relation with the first clutch element, and supplemental means carried by one of said elements for preventing the engagement of said elements when said element is rotated above a predetermined absolute speed irrespective of the speed of rotation of the other element.

17. In a clutch mechanism, a clutch element, a cooperating manually controlled clutch element movable into and out of operative relation with the first clutch element, and automatic supplemental means carried by one of said elements for preventing the engagement of said elements when said element is rotated above a predetermined absolute speed irrespective of the speed of the other element.

18. In a clutch mechanism, a clutch element, a cooperating manually controlled clutch element movable into and out of operative relation with the first element, and automatic speed controlled means carried by said first mentioned element for inhibiting engagement of said elements when said element is rotated above a predetermined speed.

19. In a clutch mechanism, a clutch element, a cooperating manually controlled clutch element movable into and out of operative relation with the first clutch element, and supplemental means carried by one of said elements and positively preventing engagement of said elements after a predetermined speed of one of the elements is attained, said means being operative in either direction of rotation of said clutch mechanism.

20. In a clutch controlling mechanism, cooperating clutch elements, means movable between positions in one of which it is interposed between said clutch elements and in the other of which it permits their engagement, and speed responsive means rotating with one of said elements whose centrifugal force tends to force said first mentioned means into the first mentioned position thereof.

In testimony whereof I affix my signature.

FRANK CARTLIDGE.